US012708916B2

(12) United States Patent
Lecoutre

(10) Patent No.: US 12,708,916 B2
(45) Date of Patent: Aug. 18, 2026

(54) SOURCE BOTTLE AND REFILLABLE DISPENSER

(71) Applicant: APTAR FRANCE SAS, Le Neubourg (FR)

(72) Inventor: Jean-Paul Lecoutre, Conde sur Iton (FR)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

(21) Appl. No.: 19/111,961

(22) PCT Filed: Sep. 18, 2023

(86) PCT No.: PCT/FR2023/051415

§ 371 (c)(1),
(2) Date: Mar. 14, 2025

(87) PCT Pub. No.: WO2024/062183

PCT Pub. Date: Mar. 28, 2024

(65) Prior Publication Data

US 2026/0021501 A1 Jan. 22, 2026

(30) Foreign Application Priority Data

Sep. 19, 2022 (FR) ...................................... 2209442

(51) Int. Cl.
*B05B 11/00* (2023.01)
*B05B 11/10* (2023.01)

(52) U.S. Cl.
CPC ...... *B05B 11/0056* (2013.01); *B05B 11/0044* (2018.08); *B05B 11/1035* (2023.01)

(58) Field of Classification Search
CPC ............. B05B 11/0056; B05B 11/0044; B05B 11/1035

(Continued)

(56) References Cited

U.S. PATENT DOCUMENTS 10,399,103 B2 * 9/2019 Lamboux ............ B05B 11/1001
2004/0211481 A1 10/2004 Garcia et al.

(Continued)

FOREIGN PATENT DOCUMENTS

WO WO-2020157436 A1 * 8/2020 ........... B05B 11/026

OTHER PUBLICATIONS

WO 2020157436 A1—English Translation (Year: 2020).*

(Continued)

*Primary Examiner* — Christopher M Afful
(74) *Attorney, Agent, or Firm* — Sughrue Mion, PLLC

(57) ABSTRACT

A source bottle(S) intended to refill a refillable dispenser (N) comprising a refillable tank (R) and a filling and venting system (R5) connected to the refillable tank (R), the source bottle(S) comprising a source tank (S1) and a pump (S2) defining an axis of movement and a pump chamber (C), the maximum dose of which is advantageously substantially equal to the maximum volume of the refillable tank (R), characterised in that the pump (S2) comprises or includes a cross-flow transfer member (St) capable of being connected to the filling and venting system (R5) of the refillable dispenser (N) to inject fluid product from the pump chamber (C) into the refillable tank (R) and to discharge the air from the refillable tank (R) into the source tank (S1).

9 Claims, 4 Drawing Sheets

(58) Field of Classification Search
USPC .......................................................... 141/18
See application file for complete search history.

(56) References Cited

U.S. PATENT DOCUMENTS

| | | | | |
|---|---|---|---|---|
| 2009/0212072 | A1* | 8/2009 | Fenton ................ | B05B 11/0044 222/173 |
| 2014/0175129 | A1* | 6/2014 | Croibier .............. | B05B 11/0056 222/321.9 |
| 2014/0305543 | A1 | 10/2014 | Lasnier et al. | |
| 2023/0294118 | A1* | 9/2023 | Bilquez ............... | B05B 11/0097 141/2 |

OTHER PUBLICATIONS

International Preliminary Report on Patentability dated Mar. 1, 2025 with a Translation of the Written Opinion of the International Searching Authority in Application No. PCT/FR2023/051415.

International Search Report for PCT/FR2023/051415 dated Jan. 4, 2024.

* cited by examiner

SOURCE BOTTLE AND REFILLABLE DISPENSER

CROSS REFERENCE TO RELATED APPLICATIONS

This application is a National Stage of International Application No. PCT/FR2023/051415 filed Sep. 18, 2023, claiming priority based on French Patent Application No. 2209442 filed Sep. 19, 2022.

The present invention relates to a source bottle intended to refill a refillable fluid product dispenser, as well as to a dispensing assembly comprising a source bottle and a refillable dispenser. The invention also relates to a refillable dispenser which is suitable to be filled with the source bottle. The favoured field of application of the present invention is that of perfumery, cosmetics, and pharmacy. This type of refillable dispenser is often designated under the term "travel" dispenser. In general, it has a tank of small capacity of about 10 millilitres (mL) at most.

In the prior art, document EP 2 977 109 is known, which describes a refillable source bottle/dispenser assembly, the source bottle of which comprises a pump that is provided with a return valve, making it possible to discharge part of the contents of the pump chamber directly into the source tank. On the other hand, the refillable dispenser comprises a tank that is provided with a venting valve, which discharges the air from the tank directly to the outside, as the fluid is injected by the pump of the source bottle into the tank of the refillable dispenser. In that document, it is not explained how and when the return valve opens when the tank of the refillable dispenser is full. A priori, nothing prevents the fluid product injected into the tank of the refillable dispenser from leaking through the venting valve. This leads to contamination of the refillable dispenser, which is not acceptable.

Document EP3310491 is also known, which describes a filling interface to be mounted between two bottles, the interface comprising, on the one hand, at least one liquid pathway arranged between the two bottles for the transfer of the liquid under pressure, from the first bottle to the second bottle turned upside down through an open vent orifice of the pump of said second bottle and, on the other hand, at least one air pathway for the evacuation of the air contained in the second bottle turned upside down towards the outside of said bottle. The drawback with this interface is that at the end of filling the second bottle turned upside down, the fluid product leaks through the air discharge pathway. This is why the interface is provided with a piece of absorbent material, such as a ring arranged around the structure of the interface, at the outlet of the air discharge pathway, in order to absorb any liquid flow that may occur after all the air inside the second bottle has been discharged to the outside. Thus, the interface is surrounded by a ring impregnated with fluid, which is not acceptable.

An object of the present invention is to overcome the above-mentioned drawbacks of the prior art by defining a refillable source bottle/dispenser assembly that enables the refillable dispenser to be filled and its air to be discharged without risking leakage of fluid product. The fluid product injected by the pump of the source bottle into the tank of the refillable dispenser discharges the air contained therein, without discharging any excess or overflow of fluid product from the refillable dispenser, at the risk of soiling it or the source bottle. The cleanliness of the refillable dispenser and the source bottle is an essential aim of the present invention.

To achieve this aim, the present invention first proposes a source bottle intended to refill a refillable dispenser comprising a refillable tank and a filling and venting system connected to the refillable tank, the source bottle comprising a source tank and a pump defining a movement axis and a pump chamber, the maximum dose of which is advantageously greater than the maximum volume of the refillable tank, characterized in that the pump comprises or includes a cross-flow transfer member capable of being connected to the filling and venting system of the refillable dispenser to inject fluid from the pump chamber into the refillable tank and discharge the air from the refillable tank into the source tank.

Thus, air inside the refillable tank is discharged into the source tank through filling and venting system of the refillable dispenser and the cross-flow t transfer member integrated into the pump of the source bottle. Because of this, even if an excess or overflow of fluid product is injected by the pump from the source bottle into the refillable tank, it will be discharged into the source tank by the same path as the air inside the refillable tank. Consequently, there is no longer any risk of fluid product leaking at the end of filling.

Unlike the system of document EP 3 310 491, which comprises an interface to be fitted between two bottles, the cross-flow transfer member of the invention is an integral part of the source bottle, and more particularly of the pump of the source bottle. Once the filling operation has been completed, the cross-flow transfer member of the invention cannot be removed from the pump, as is the case with the interface of document EP 3 310 491.

Advantageously, the cross-flow transfer member may comprise a hollow venting rod, which is movable between a rest position and a depressed position, the hollow venting rod defining an outer end for connection with the filling and venting system and an inner end for communication with the source tank, the hollow venting rod passing through the pump chamber, advantageously in an axial and centred manner, its inner end being closed in the rest position and communicating with the source tank in the depressed position. This venting rod therefore makes it possible to pass the air from the filling and venting system of the refillable dispenser directly into the source tank, without passing into the pump chamber of the source bottle. It can be said that this venting rod shunts the pump chamber, but passing through it. Thus, the air path does not bypass the pump, but passes through it, preferably axially, without mixing with the fluid product inside the pump chamber.

Advantageously, the cross-flow transfer member may comprise a sleeve that defines an outer flange for connection with the filling and venting system and an inner edge for communication with the pump chamber, the hollow venting rod passing through the sleeve, a return spring advantageously acting between the sleeve and the hollow venting rod to urge the hollow venting rod into the rest position, the inner edge being closed by the hollow venting rod in the rest position and communicating with the pump chamber in the depressed position. This sleeve can be likened to a conventional valve rod, the internal duct of which makes it possible to route the fluid out of the pump chamber, downstream from the outlet valve. In the present invention, it is as the internal duct of this conventional valve rod were traversed by a hollow venting rod, so that the fluid product is conveyed around the venting rod. Fluid product flows up through the stationary sleeve towards the filling and venting system, while air flows down through the venting rod directly into the source tank.

According to another feature of the source bottle, the pump chamber may comprise a bellows that defines a stationary base that forms an inlet for the fluid product and a pathway for the hollow venting rod, the bellows also defining a deformable membrane and an anchor collar, the pump chamber also comprising a cover that is mounted on the anchor collar, the cross-flow transfer member being secured to the cover, the sleeve advantageously being made in one piece with the cover. The sleeve is integral in movement with the cover, which is axially movable back and forth and the hollow venting rod is axially movable back and forth in the sleeve. The venting rod, in its rest position, is closed at its inner end by the pathway formed in the stationary base of the bellows. In the depressed position, the inner end of the venting rod projects out of the pathway and extends into the source tank.

In other words, the sleeve and the venting rod together form the outlet valve of the pump chamber, which opens by the axial movement of the venting rod relative to the sleeve. In addition, the venting rod and the pump base form an air outlet valve, which opens by the axial movement of the venting rod relative to the pump base. The air and fluid product streams are not only crossed, but also concentric, and advantageously axially centred.

The present invention also defines a dispensing assembly comprising a source bottle as defined above, and a refillable dispenser comprising a dispensing member, such as a pump or a valve, provided with a dispensing head, a refillable tank and a filling and venting system connected to the refillable tank, characterised in that the filling and venting system comprises a fluid product filling valve and an air venting valve, the two valves being actuatable manually and simultaneously when the refillable dispenser is connected to the source bottle. Given that the connection is made by a pressed axial contact, the actuation of the valves is also axial.

According to an advantageous aspect, the filling and venting system may comprise a venting tube connected to the air venting valve and extending into the refillable tank towards the dispensing member. Thus, the free end of the venting tube is located at the top of the refillable tank, such that the air is discharged at the top of the tank. When the fluid product injected into the refillable tank reaches the free end of the venting tube, filling is completed. In practice, there may be an excess of injected fluid product, but it will be directly discharged through the venting tube, the air venting valve and the hollow venting rod to return to the source tank. Both an ideal filling and a quantity of air remaining in the refillable tank, which is sufficient to absorb pressure and temperature variations, are ensured.

Advantageously, the air venting valve may be arranged axially centrally, and the fluid product filling valve extends around the air venting valve. This configuration corresponds to that of the cross-flow transfer member, with the hollow venting rod being surrounded by the sleeve.

Preferably, the filling and venting system may include an axial connecting well in communication with the air venting valve and a concentric sliding bushing in communication with the fluid product filling valve. The outer connecting end of the hollow venting rod is adapted to come into pressed axial contact with the axial connecting well, so as to move both the well and the rod. In addition, the outer connecting flange of the sleeve is adapted to come into leaktight sliding contact with the concentric sliding bushing.

According to a practical embodiment, the filling and venting system may comprise a movable valve part forming the axial connecting well, a movable axial venting valve member and a movable peripheral filling valve member, the filling and venting system also comprising a stationary seat part forming an axial venting valve seat cooperating with the movable axial venting valve member and a peripheral filling valve seat cooperating with the movable peripheral filling valve member. The axial connecting well is thus axially movable relative to the concentric sliding bushing, which is stationary.

The present invention also defines a refillable dispenser comprising a dispensing member, such as a pump or a valve, provided with a dispensing head, a refillable tank and a filling and venting system connected to the refillable tank, the filling and venting system comprising a fluid product filling valve and an air venting valve, the two being valves actuatable manually and simultaneously when the refillable dispenser is connected to the source bottle, characterised in that the filling and venting system comprises a venting tube connected to the air venting valve and extending into the refillable tank towards the dispensing member. This refillable dispenser, with its air venting valve provided with a venting tube, is part of an inventive concept common with the source bottle implementing a pump provided with a cross-flow transfer member to discharge the air from the refillable tank into the source tank. Indeed, the air can only be discharged if the air inside the refillable tank is collected close to the dispensing member. Without this venting tube, discharging the air is not possible, making the filling equally impossible and the source bottle of the invention unusable.

The invention is described below more fully with reference to the accompanying drawings, which show an embodiment of the invention by way of non-limiting example.

In the figures:

FIG. 1 is a vertical section view through an assembly of the invention, including a source bottle and a refillable dispenser ready to be mounted on the source bottle;

FIG. 2 is a view similar to that of FIG. 1 with the refillable dispenser mounted on the source bottle, FIG. 3 is an enlarged view of FIG. 1, showing the upper part of the source bottle and the lower part of the refillable dispenser ready to be mounted on the source bottle, FIG. 4 is an enlarged view of FIG. 2, showing the upper part of the source bottle engaged with the lower part of the refillable dispenser;

Figure 1:
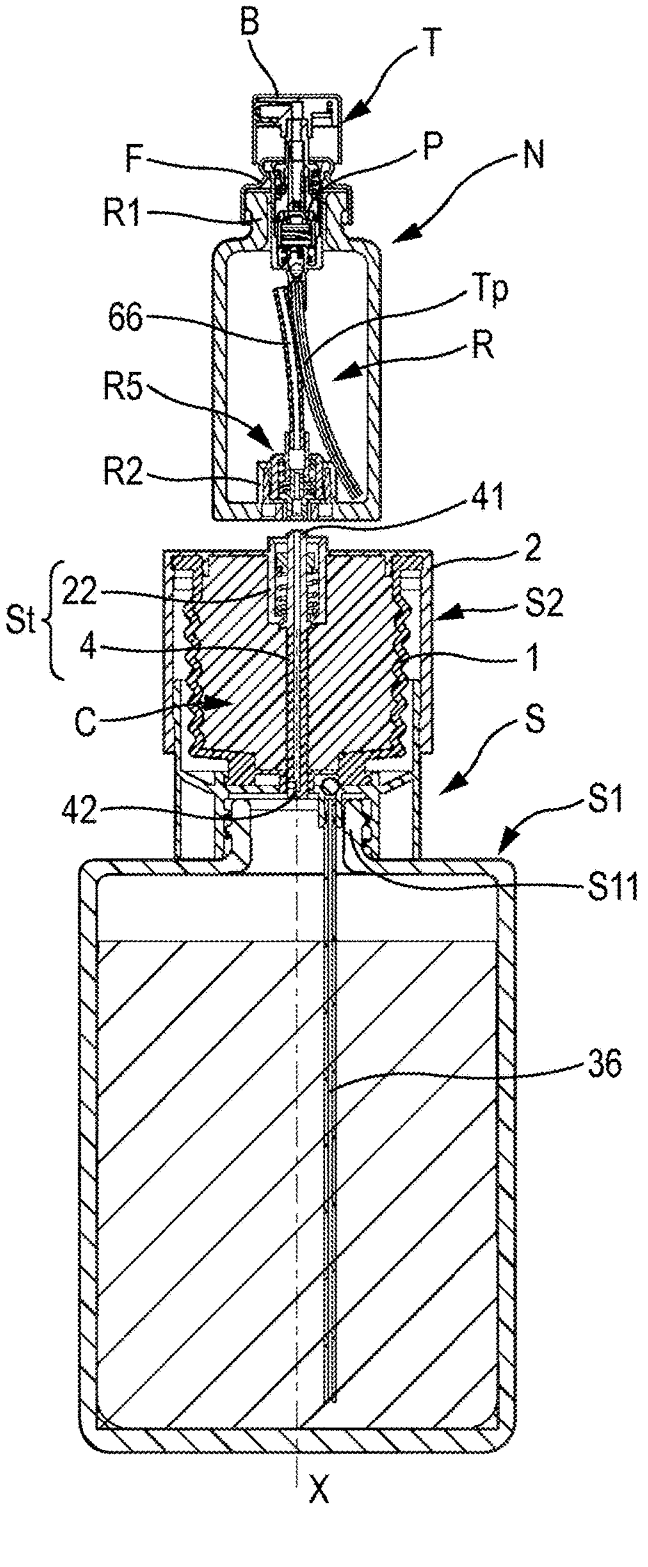
Figure 2:
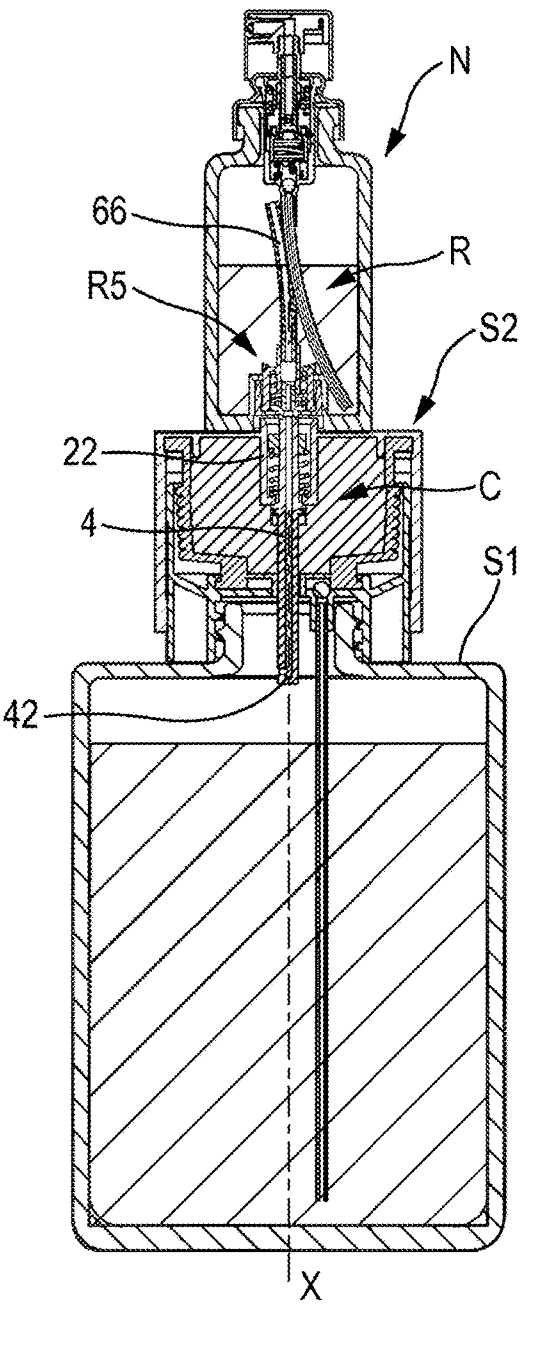

Reference is made firstly to FIGS. 1 and 2 in order to describe in an overall manner the structures of the source bottle S and the refillable or "travel" dispenser N.

The refillable dispenser N may be of an entirely conventional type, except for its filling and venting system R5, which will be described in greater detail with reference to FIGS. 5 to 6. Thus, the refillable or "travel" dispenser N comprises a refillable tank R forming at its upper end a neck R1 and at its lower end a reception housing R2 for the filling and venting system R5. In an entirely conventional manner, the neck R1 of the tank R is provided with a dispensing head T, which comprises a dispensing member, in particular a pump P, capped with a push-button B. The pump P is provided with a dip tube Tp which extends into the tank R up to its bottom where the filling and venting system R5 is located. For fastening on the neck R1, a fastening ring F is provided, which may for example be a crimping ring.

By pressing the push-button B, fluid product is put under pressure in the pump P, the outlet valve of which will open to allow the fluid to travel up to the push-button B, which is advantageously provided with a nozzle for spraying. As soon as the push-button B is released, fluid product from the tank R is sucked through the dip tube Tp into the pump chamber of the pump P. Such an operating cycle is entirely conventional for a dispensing head in the fields of perfumery, cosmetics, and pharmacy.

Without going into the structural details of the filling and venting system R5, it can still be noted that this system R5 comprises a venting tube 66 that extends into the tank R until it is close to the pump P or the neck R1. In other words, the free end of the venting tube 66 is located near the connection of the dip tube Tp to the pump P.

The source bottle S firstly comprises a source tank S1 which may have any shape and be made of any appropriate material. The source tank S1 forms a neck S11 on which a pump S2 is mounted, which is the heart of the invention with the filling and venting system R5 of the refillable dispenser N.

Without going into too much detail, the pump S2 comprises a pump chamber C, which is essentially bounded by a bellows 1 associated with a cover 2. According to the invention, this pump chamber C is further provided with a cross-flow transfer member St, which essentially consists of a sleeve 22 and a hollow venting rod 4, as described below. Very succinctly, the rod 4 comprises an external connecting end 41 intended to come into pressed contact with the refillable tank N and an internal communication end 42, which is either closed in the rest position or in communication with the source tank S1 in the actuated or depressed position. Indeed, it can be noted in FIG. 1, which corresponds to the rest position of the pump S2, that the internal communication end 42 is located at the bottom of the pump S2. On the other hand, in FIG. 2 corresponding to the actuated or depressed position of the pump S2, it should be noted that the internal communication end 41 projects largely inside the source tank S1, such that communication is established between the tank S1 and the inside of the hollow venting rod. It may also be noted in FIG. 2 that the volume of the pump chamber C is smaller than that in FIG. 1. The actuation of the pump is generated by the axial downward pressure of the "travel" distributor N on the pump S2 and, more particularly, on the outer end of the connection 41 of the hollow venting rod 4, which is moved axially with respect to the sleeve 22.

Figure 3:
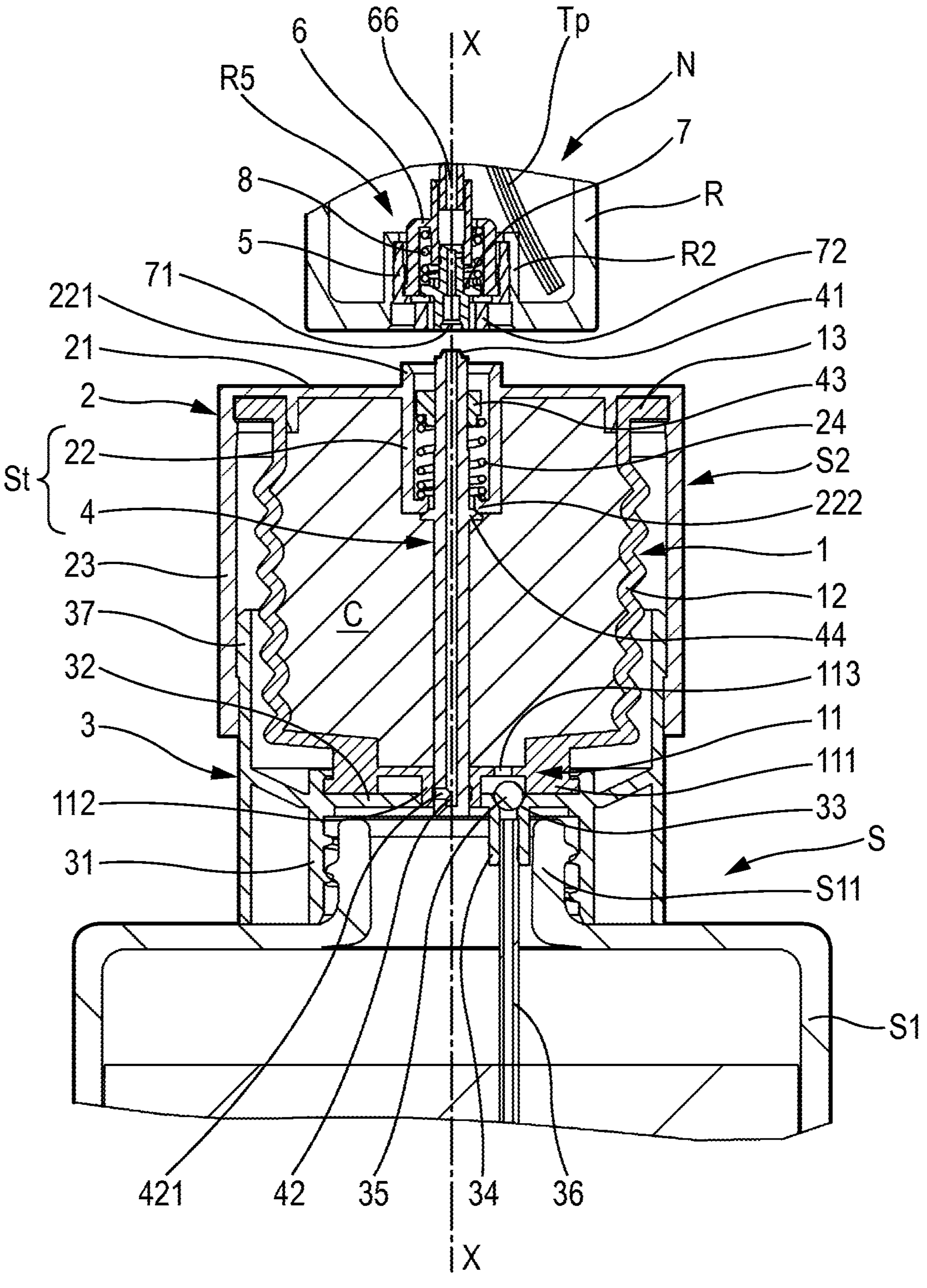

With reference to FIG. 3, we can see the pump S2 at rest, as well as the filling and venting system R5 of the "travel" distributor N.

Regarding the pump S2, the bellows 1 comprises a stationary and rigid base 11, which defines an annular fixing stub 111, a pathway 112 and a fluid product inlet 113. The pathway 112 is centred on the axis X of the pump, while the inlet 113 is offset, on the right in FIG. 3. The pathway 112 makes it possible to make the pump chamber C communicate directly with the source tank S1. The bellows 1 also includes a deformable membrane 12, which forms annular folds. The membrane 12 is crushed along the axis X. At the end of this membrane 12, the bellows 1 forms an anchoring collar 13, which is rigid, just like the fixing stub 111. The bellows 1 may be made as a single piece out of a flexible material, such as an elastomer.

The cover 2 comes into sealing engagement with the anchor collar 13, so as to define the pump chamber C with the bellows 1. The cover 2 comprises a top plate 21 and a peripheral skirt 23, which is substantially cylindrical.

The cross-flow transfer member St is formed at the plate 21 of the cover 2. More precisely, the sleeve 22 is formed in one piece with the plate 21. It comprises an external connection an internal flange 221 and communication edge 222. The inner edge 222 extends radially inwards so as to form an open bottom for the sleeve 22.

The hollow venting rod 4 extends on the X axis through the sleeve 22 and the pump chamber C. The outer connecting end 41 projects slightly from the outer connecting flange 221. Its internal communication end 42 forms a lateral opening 421, which is located at the pathway 112, so as to close it. The rod 4 also comprises a valve collar 44, which projects radially outwards, and which is located below the sleeve 22, so as to come into sealed contact with the internal communication edge 222. Thus, the valve collar 44 and the inner edge 222 together form an outlet valve of the pump chamber C. The rod 4 is held in this rest configuration, with the valve closed, by the action of a spring 24, which bears, on the one hand, on a shoulder 43 of the rod 4 and, on the other hand, on the inner edge 222. The action of this spring 24 presses the valve collar 44 in a sealed manner against the inner edge 222.

To hold the pump S2 on the neck S11 of the source tank S1, a fastening ring 3 is also provided, which comprises a screw-on skirt 31 in threaded engagement with the neck S11 of the source tank S1. The skirt 31 is also in engagement with the fixing stub 111 of the bellows 1. The ring 3 also forms a wall 32 that extends above the neck S11 and is formed with an opening for engaging the pathway 112. This wall also forms a valve seat 33 for a ball 35, as well as a tube holder 34 in which there is engaged a dip tube 36 that extends in the source tank S1 until it is close to its bottom wall. The fluid inlet 113 communicates directly with the space in which the ball 35 is confined. The seat 33 and the ball 35 together form a fluid product inlet valve for the pump chamber C. In addition, the ring 3 forms a cylindrical guide bushing 37 around which the skirt 23 of the cover 2 is engaged. Complementary shoulders can define the rest position of the pump S2.

Figure 4:
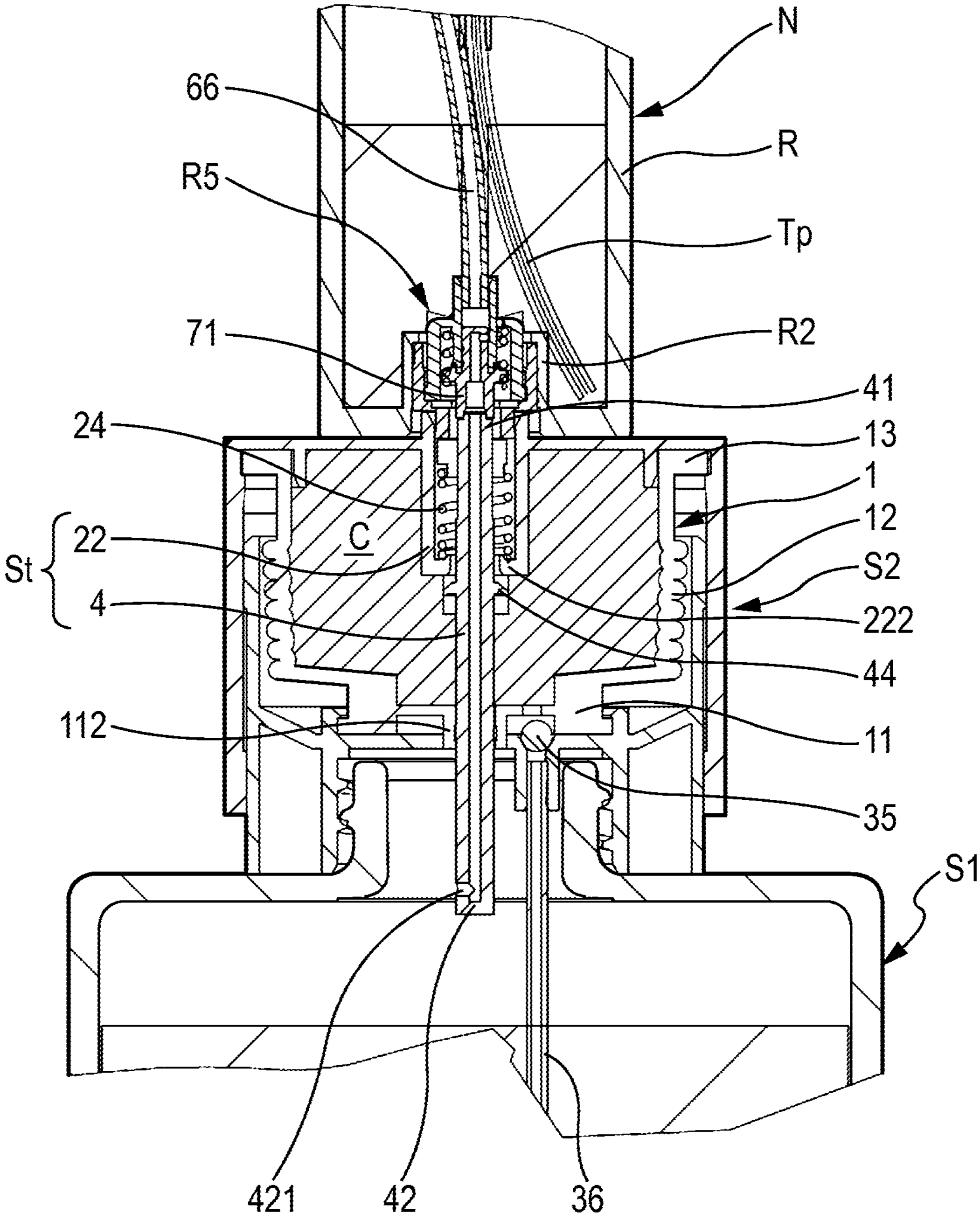

With reference to FIG. 4, the pump S2 can be seen in the actuated or depressed position. The pump is actuated by axially pressing the refillable distributor N, in particular on the external connecting end 41. In FIG. 4, it should be noted that the membrane 12 is crushed and that the valve is open, since the valve collar 44 is now detached from the inner edge 222. The fluid product under pressure in the pump chamber C can thus escape through the valve open inside the sleeve 22. From there, it reaches the filling and venting system R5 of the "travel" distributor N, the structure and operation of which will be explained below. It should also be noted that the inner end 42 of the rod 4 has been displaced from the pathway 112 inside the source tank S1. Its lateral opening 421 communicates directly with the upper part of the source tank S1 which is filled with air. Thus, the air trapped in the tank R of the refillable dispenser N can be discharged through the venting tube 66, the filling and venting system R5, into the hollow venting tube 4 to reach the upper part filled with air of the source tank S1. The outlet valve of the pump chamber C is opened and the lateral opening 421 is placed in communication with the source tank S1 by two simultaneous and nested movements, namely the axial movement of the hollow rod 4 relative to the sleeve 22 and the axial movement of the sleeve 22 by crushing the flexible membrane 12. The air passes through the pump chamber C and the fluid product is discharged out of the chamber C through the sleeve 22 around the rod 4, at its part located inside the sleeve 22.

When the pressing force on the refillable dispenser N is released, the return spring 24 returns the valve collar 44 into sealed contact with the inner edge 222 and the elasticity of the flexible membrane 12 returns the cover 2 into the rest position shown in FIG. 3. In doing so, a vacuum is created in the pump chamber C, which has the effect of sucking fluid product through the dip tube 36 and the inlet valve 33, 35 forced into the open state.

Figure 5:
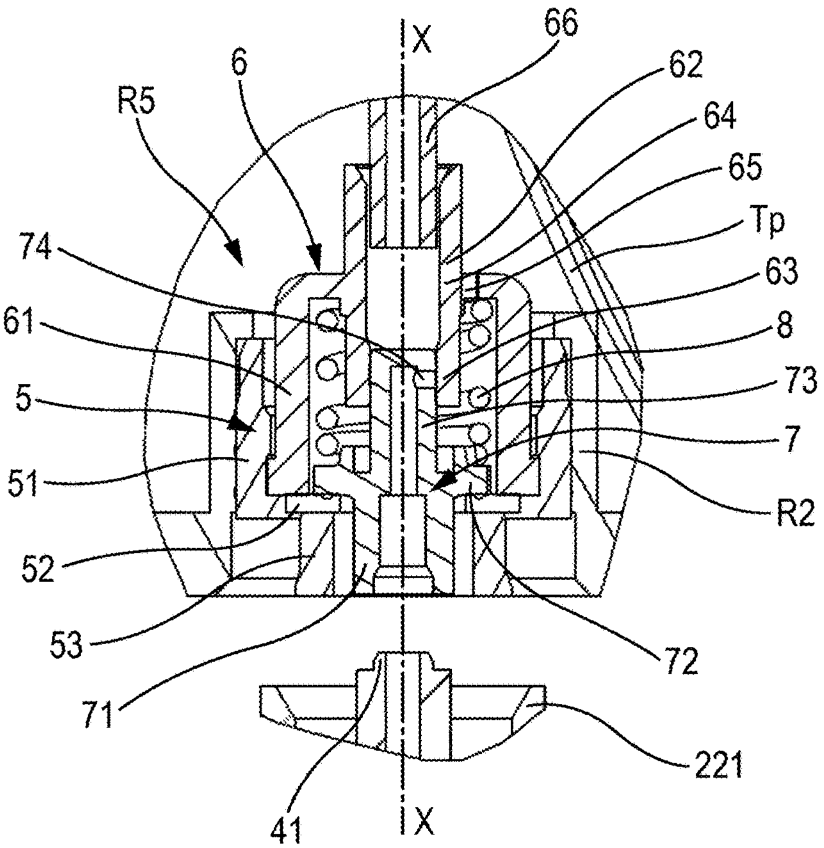
FIG. 5 is a further greatly enlarged view of FIG. 3.
Figure 6:
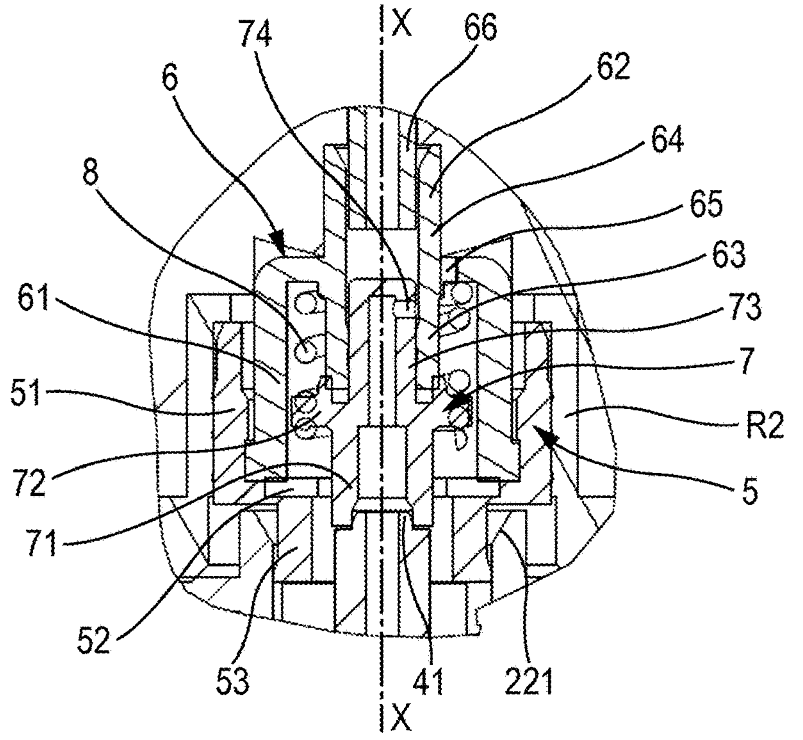
FIG. 6 is a further greatly enlarged view of FIG. 4.

FIGS. 5 and 6 show in greater detail the filling and venting system R5 of the refillable dispenser N, respectively in its rest position in FIG. 5 and in its open or actuated position in FIG. 6.

As mentioned above, the filling and venting system R5 is received in a fixed and sealed manner inside the reception housing R2 formed at the bottom of the tank R of the refillable dispenser N.

This filling and venting system R5 firstly comprises a body part 5, which is received in a fixed and sealed manner inside the reception housing R2. This body part 5 comprises a sealed mounting ring 51 in engagement with the housing R2 and a sliding bushing 53, which is accessible from the outside. The body part 5 also supports an annular seal 52, just above the bushing 53 inside the sealed mounting ring 51.

The system R5 also includes a bell 6 that is fixedly and sealingly mounted inside the body part 5. This bell 6 comprises an outer casing 61, which is received inside the sealed mounting ring 51, so as to hold the annular seal 52 in place. The bell 6 also forms an axial tubing 62, which defines a sealing section 63 of reduced diameter and a pathway section 64 of increased diameter. The sealing section 63 is arranged axially below the pathway section 64. Where the casing 61 joins the tubing 62, several openings 65 are provided, which are arranged around the tubing 62.

The system R5 also comprises a movable valve part 7, which can move axially back and forth inside the body part 5 and the bell 6 against a return spring 8. This movable valve part 7 comprises an axial connecting well 71, which is open downwards, towards the outer connecting end 41 of the source bottle S. The movable valve part 7 also forms an annular valve flange 72, which extends radially outwards around the well 71. This annular flange 72 comes into sealed abutment against the annular seal 52 under the action of the spring 8. The part 7 also forms a nipple 73 which defines a lateral opening 74 located at the sealing section 63 of the tubing 62, so as to seal it. This position corresponds to the position shown in FIG. 5, namely the rest position.

The filling and venting system R5 thus forms a fluid product filling valve formed jointly by the annular flange 72 and the annular seal 52 and an air venting valve formed jointly by the nipple 73 and the sealing section 63. These two valves can be actuated axially and simultaneously by moving the movable valve part 7 relative to the parts 5 and 6, which forms a stationary seat part. It should also be noted that the air venting valve is located on the axis X, while the filling valve is arranged concentrically or peripherally around the air venting valve. The same applies for the sliding bushing 53, which is arranged concentrically around the axial connecting well 71. In the rest position in FIG. 5, the bottom of the bushing 53 and the bottom of the well 71 are substantially or perfectly aligned. The refillable dispenser N can thus be added and centred on the external connecting end 41 of the source bottle S.

In FIG. 6, the refillable dispenser N is pressed downwards along the axis X against the source bottle S. It can be seen that the external connecting end 41 is engaged with the axial connecting well 71. In addition, the external connecting flange 221 is engaged around the sliding bushing 53, establishing a sliding radial contact between them. It should also be noted that the outer connecting end 41 has been moved downwards relative to the outer connecting flange 221 against the spring 24. In addition, the movable valve part 7 has been moved upwards relative to the parts 5 and 6 against the spring 8. The annular flange 72 is detached from the annular seal 52 and the radial opening 74 of the nipple 73 is now located at the pathway section 64 of increased diameter. Thus, the fluid product expelled through the sleeve 22 can flow inside the bushing 53, the seal 52, the casing 61, then through the openings 65 to reach the inside of the tank R of the refillable dispenser N. On the other hand, the air inside the tank R can be discharged through the venting tube 66, the pathway section 64, the lateral opening 74, the nipple 73, the axial connecting well 41, the hollow venting rod 4, then finally through the lateral opening 421 of its internal end 42 to reach the top part filled with air of the source tank S1.

Regarding the sequencing of the fluid product valves of the source bottle and the mobile dispenser, it is preferable for the valve 44, 222 of the source bottle S to open slightly before the valve 52, 72 of the travel dispenser N, so as not to create an overpressure between the source bottle and the travel dispenser, which could lead to a leak of fluid product.

The structure and operation of the filling and venting system R5 being thus described, it is possible to return to FIG. 4. In this actuated or depressed position, fluid product has been injected into the tank R of the "travel" or rechargeable dispenser N. Advantageously, the dose of fluid product delivered by the pump S2 is greater than the useful volume of the tank R. In any case, it is virtually inevitable that, at the end of filling, an excess or overflow of fluid product will be discharged through the venting tube 66, the filling and vent system R5 and the hollow venting rod 4. This poses absolutely no problem with the invention, given that this excess or overflow of fluid product flows exactly in the same way as the air inside the tank R and returns to the source bottle S. Thus, there is no risk of fluid product leaking, due to an overflow from the tank R, as is the case in the aforementioned prior art documents.

It should be noted that the use of the hollow venting rod 4 only makes sense if the filling and venting system R5 of the refillable dispenser N is provided with a venting tube 66, which extends towards the top of the tank. Indeed, without this venting tube 66, the fluid product injected into the tank R would return directly into the source tank S1 through the hollow rod 4. As a result, the hollow rod 4 and the venting tube 6 participate in the same common inventive concept. In addition, the venting tube 66 determines the quantity of fluid product injected into the refillable tank, leaving a small quantity of air, which makes it possible to absorb pressure and temperature variations.

Without going beyond the scope of the invention, it is possible to replace the bellows 1 by a conventional piston that slides in a cylindrical barrel. It is also possible to envisage making the filling and venting system R5 with another architecture, insofar as it uses two axially actuated valves and a venting tube 66.

The invention claimed is:

1. A source bottle for refilling a refillable dispenser comprising a refillable tank and a filling and venting system connected to the refillable tank, the source bottle comprising a source tank and a pump defining a displacement axis and a pump chamber, wherein the pump comprises a cross-flow transfer member that can be connected to the filling and venting system of the refillable dispenser to inject fluid product from the pump chamber into the refillable tank, and discharge the air inside the refillable tank into the source tank.

2. The source bottle according to claim 1, wherein the cross-flow transfer member comprises a hollow venting rod, which is movable between a rest position and a depressed position, the hollow venting rod defining an outer end for connection with the filling and venting system and an inner end for communication with the source tank, the hollow venting rod advantageously passing through the pump chamber in an axial and centered manner, its inner end being closed in the rest position and communicating with the source tank in the depressed position.

3. The source bottle according to claim 2, wherein the cross-flow transfer member comprises a sleeve that defines an outer flange for connection with the filling and venting system and an inner edge for communication with the pump chamber, the hollow venting rod passing through the sleeve, a return spring that advantageously acts between the sleeve and the hollow venting rod in order to urge the hollow venting rod into the rest position, the inner edge for communication being closed by the hollow venting rod in the rest position and communicating with the pump chamber in the depressed position.

4. The source bottle according to claim 3, wherein the pump chamber comprises a bellows defining a stationary base forming a fluid inlet and a pathway for the hollow venting rod, the bellows also defining a deformable membrane and an anchor collar, the pump chamber also comprising a cover mounted on the anchor collar, the cross-flow transfer member being secured to the cover, the sleeve advantageously being made in one piece with the cover.

5. A dispensing assembly comprising:

a. a source bottle according to claim 1, and b. a refillable dispenser comprising a dispensing member, such as a pump or a valve, provided with a dispensing head, a refillable tank and a filling and venting system connected to the refillable tank, wherein the filling and venting system comprises a fluid product filling valve and an air venting valve, both valves being actuatable manually and simultaneously when the refillable dispenser is connected to the source bottle.

6. The dispensing assembly according to claim 5, wherein the filling and venting system comprises a venting tube connected to the air venting valve and extending into the refillable tank towards the dispensing member.

7. The dispensing assembly according to claim 5, wherein the air venting valve is arranged axially centrally and the fluid product filling valve extends around the air venting valve.

8. The dispensing assembly according to claim 5, wherein the filling and venting system comprises an axial connecting well in communication with the air venting valve and a concentric sliding bushing in communication with the fluid product filling valve.

9. The dispensing assembly according to claim 8, wherein the filling and venting system comprises a movable valve part forming the axial connecting well, a movable axial venting valve member, and a movable peripheral filling valve member, the filling and venting system also comprising a stationary part, forming an axial venting valve seat cooperating with the movable axial venting valve member, and a peripheral filling valve seat cooperating with the movable peripheral filling valve member.

* * * * *